(12) United States Patent  
Schroth (10) Patent No.: US 7,017,194 B2  
(45) Date of Patent: Mar. 28, 2006

(54) RESTRAINT SYSTEM FOR RESTRAINING A PERSON IN A VEHICLE OF TRANSPORTATION

(75) Inventor: Carl-Jürgen Schroth, Soest (DE)

(73) Assignee: Schroth Safety Products GmbH, Arnsberg (DE)

( * ) Notice: Subject to any disclaimer, the term of this patent is extended or adjusted under 35 U.S.C. 154(b) by 150 days.

(21) Appl. No.: 10/806,067

(22) Filed: Mar. 22, 2004

(65) Prior Publication Data

US 2004/0216206 A1 Nov. 4, 2004

(30) Foreign Application Priority Data

Mar. 28, 2003 (DE) .................. 103 14 423

(51) Int. Cl.  
*A42B 1/06* (2006.01)

(52) U.S. Cl. .................. 2/410; 2/425; 2/468; 297/464; 297/470; 297/484; 280/290

(58) Field of Classification Search .............. 2/468, 2/6.1, 425, 6.2, 410; 244/122 AG; 280/290; 297/464, 465, 470, 484

See application file for complete search history.

(56) References Cited

U.S. PATENT DOCUMENTS

| | | | | |
|---|---|---|---|---|
| 2,794,653 | A | * | 6/1957 | Sullivan ..................... 297/484 |
| 3,968,994 | A | * | 7/1976 | Chika ......................... 297/486 |
| 4,638,510 | A | | 1/1987 | Hubbard |
| 5,213,366 | A | * | 5/1993 | Sweger, Jr. ................. 280/808 |
| 5,272,770 | A | * | 12/1993 | Allen et al. .................... 2/421 |
| 6,009,566 | A | | 1/2000 | Hubbard |
| 6,367,882 | B1 | * | 4/2002 | Van Druff et al. .......... 297/484 |
| 6,751,809 | B1 | * | 6/2004 | Cooper et al. ................. 2/421 |
| 2002/0153761 | A1 | * | 10/2002 | Rivera et al. ............... 297/484 |

FOREIGN PATENT DOCUMENTS

DE 101 14 343 A1 10/2002

* cited by examiner

*Primary Examiner*—Rodney M. Lindsey  
(74) *Attorney, Agent, or Firm*—Henry M. Feiereisen (57) ABSTRACT

A restraint system for restraining a person in a vehicle of transportation, includes a safety harness having length adjustable shoulder belts and a buckle for connecting the shoulder belt on a chest-side of a person and a stiff U-shaped shoulder yoke having legs, which are contoured to a torso of the person, and a high collar interconnecting the legs, whereby the shoulder belts are secured by a fastening mechanism behind the collar. The legs of the shoulder yoke and the shoulder belts have confronting sides which are formed, at least partially, with an interacting engagement structure which is configured to increase friction as the shoulder belts move in relation to the legs in longitudinal direction, while inhibiting a displacement of the shoulder belts in relation to the legs in transverse direction.

17 Claims, 8 Drawing Sheets

218 # RESTRAINT SYSTEM FOR RESTRAINING A PERSON IN A VEHICLE OF TRANSPORTATION

CROSS-REFERENCES TO RELATED APPLICATIONS

This application claims the priority of German Patent Application, Serial No. 103 14 423.4, filed Mar. 28, 2003, pursuant to 35 U.S.C. 119(a)–(d), the disclosure of which is incorporated herein by reference.

BACKGROUND OF THE INVENTION

The present invention relates, in general, to a restraint system for restraining a person in a vehicle of transportation, and more particularly to an arrangement for positioning the shoulder belts of a safety harness in longitudinal direction of legs of a U-shaped shoulder yoke.

Due to the ever increasing speeds in motor sport, especially formula racing, head and neck injuries become more and more common, when a racecar crashes against track barriers or in the event of a collision between two cars. Oftentimes these injuries resulted in catastrophic outcomes such as paralysis or even death. Therefore, head and neck restraining systems have been developed to prevent the head of a driver, in the event of a crash against a standing or moving obstacle, from striking the steering wheel or other cockpit parts. These head and neck supports have been commercialized under the trade name HANS and are described, for example, in U.S. Pat. Nos. 4,638,510 and 6,009,566. These types of head and neck supports include a stiff U-shaped shoulder yoke, which is made of plastic and includes two legs, and a high collar to interconnect the legs. Attached laterally to the collar are tethers which are connected to the helmet of the driver. The tethers have hereby a length that allows a limited mobility of the head during the race.

Secured to the back wall of the cockpit behind the driver are two shoulder belts of a safety harness and routed over the legs of the yoke to a buckle on the chest side of the driver. The leg surfaces confronting the shoulder belts are so constructed as to oppose relative movements of the shoulder belts by a fairly high frictional resistance. When the length-adjustable shoulder belts are taut, the yoke, which conforms to the torso of the driver, is wedged between the torso and the shoulder belts. In the event of a crash, the torso slides into the shoulder belts as a consequence of inertia in acceleration direction, while the yoke remains substantially in the initial position in view of the friction with the shoulder belts so that a shift takes place between the yoke and the torso. Thus, the distance between the collar and the helmet moving in acceleration direction increases. This leads to a tightening of the tethers so that the driver's head is prevented from moving forward in relation to the torso and from striking the steering wheel or other parts of the cockpit. The use of the HANS system is thus able to significantly reduce head and neck injuries.

Helicopter crashes experience substantially vertical retardations which are superimposed only to a limited degree by forward retardation. Oftentimes, the helicopter tilts partially to the side before impacting the ground. While injuries of the lower spinal column during vertical impact have been reduced by the recent development of seats with vertically acting energy converters, injuries to the head have been on the rise as the head bends and can even strike the sternum with the chin. This is especially of concern in military choppers where occupants wear helmets that have a weight of almost 2 kg. Although this situation can be improved through integration of airbags, such systems necessitate a modification of the compartment structure of the helicopter, the arrangement of complicated sensors and the provision of monitoring systems. Costs and added weight thus render this approach economically unviable.

Therefore, the use of a HANS system also for helicopters to protect occupants has been proposed. However, a drawback of the HANS system is the relative distance between the shoulder belts and the occupant's body as the shoulder belts run upon the legs of the yoke. Thus, the shoulder belts have a tendency to slide to the side of the legs because they seek the shortest way from the anchor point at the back wall of a cockpit or a seat structure behind the collar to the chest-side buckle of the safety belt.

An attempt to address this problem involves a closer disposition of the anchor points of the shoulder belts behind the collar. Another approach involves the use of belt straps for the shoulder belts of a width which is smaller than a width of the legs of the yoke. Still another approach involves a particular configuration of the shoulder belts, as disclosed, for example, in German patent publication no. DE 101 14 343 A1. However, for a number of reasons, these various proposals are endowed with drawbacks and shortcomings relating for example to manufacturing techniques or to the effect that is hoped to be obtained but may not always be realized.

It would therefore be desirable and advantageous to provide an improved restraint system to obviate prior art shortcomings and to afford a required freedom of movement of an occupant of a transportation vehicle such as racecar or helicopter, while effectively preventing a sliding of the shoulder belts to the side, even when the shoulder belts move in longitudinal direction relative to the legs of a shoulder yoke.

SUMMARY OF THE INVENTION

According to one aspect of the present invention, a restraint system for restraining a person in a vehicle of transportation includes a safety harness having length adjustable shoulder belts and a buckle for connecting the shoulder belts on a chest-side of a person, a stiff U-shaped shoulder yoke having legs, which are contoured to a torso of the person, and a high collar interconnecting the legs, and a fastening mechanism for securing the shoulder belts behind the collar, wherein the legs of the shoulder yoke and the shoulder belts have confronting sides which are formed, at least partially, with an interacting engagement structure which is configured to increase friction as the shoulder belts move in relation to the legs in longitudinal direction, while inhibiting a displacement of the shoulder belts in relation to the legs in transverse direction. Suitably, one of the sides may be the topside of the legs of the shoulder yoke, and the other one of the sides is the underside of the shoulder belts.

The present invention resolves prior art problems by at least partially construct confronting flat sides of the legs of the shoulder yoke and the shoulder belts in such a manner that the shoulder belts are able to move in longitudinal direction of the legs but are prevented from moving relative to the legs in transverse direction. Thus, the shoulder belts remain disposed on the legs. Such an engagement structure between the confronting sides of the shoulder belts and the legs of the yoke is advantageous because it does not lead to a permanent connection of the shoulder belt with the yoke;

Rather, the shoulder belts can be detached from the yoke at any time to allow an occupant to rapidly leave the vehicle, e.g. a racecar or a helicopter. On the other hand, the engagement structure applies enough friction between the shoulder belts and the legs, even when wet. The engagement structure can be designed directly on the shoulder belts and the legs, or it may also be designed upon separate components which are then securely fixed to the shoulder belts and legs, components which are then securely fixed to the shoulder belts and legs, respectively.

As pilots and co-pilots require a field of view in all directions, they need to have more mobility compared to a driver in a racecar who is tightly harnessed. Thus, the guidance of the shoulder belts in accordance of the present invention is of particular relevance here in order to utilize a HANS system also in these situations.

According to another feature of the present invention, the engagement structure may include a longitude bead formed on one of the confronting sides between the shoulder belts and the legs, and a longitude groove formed on the other one of the confronting sides and having a configuration which is suited to a cross section of the longitude bead. Thus, the longitude bead engages in the longitude groove to allow a reliable movement of the shoulder belt in relation to the legs while inhibiting a relative movement in transverse direction.

According to another feature of the present invention, the engagement structure may include a shallow strip embedded in a channel-shaped depression of the topside of the legs of the shoulder yoke and formed with parallel longitude beads and longitude grooves in neighboring relationship for interaction with complementary opposite longitude grooves and longitude beads in neighboring relationship formed on the underside of the shoulder belts. The provision of such longitude beads and longitude grooves on the legs for interlocking engagement with longitude grooves and longitude beads on the shoulder belts leads to an improved forced guidance of the shoulder belts upon the legs and an even better assurance against transverse movement. Suitably, the longitude beads and longitude grooves are directly formed on the shallow strip which may be glued in the channel-shaped depression.

According to another feature of the present invention, the longitude beads of the shallow strip and the underside of the shoulder belts may have an arched cross section, and the longitude grooves of the shallow strip and the underside of the shoulder belts may have a complementary trough-shaped cross section. In this way, an even better form-fitting engagement of the shoulder belts with the legs of the yoke can be realized.

According to another feature of the present invention, the longitude beads and longitude grooves of the shallow strip and the underside of the shoulder belts may have a triangular cross section defined by a first surface extending at an inclination to a plane of the shallow strip and a second surface extending at a right angle to the plane, with the second surface of the longitude beads of the legs of the shoulder yoke directed frontally to a vertical longitudinal center axis defined between the legs of the shoulder yoke. This type of saw-tooth type engagement structure leads to an interlocking connection, without interfering with a limited longitudinal movement. A shift of the shoulder belts away from the vertical longitudinal center axis of the yoke is hereby reliably prevented.

According to another feature of the present invention, the engagement structure may include a shallow strip embedded in a channel-shaped depression of the topside of the legs of the shoulder yoke and formed with a central longitude groove, and a longitude bead formed on the underside of the shoulder belt and having a configuration complementing a configuration of the longitude bead.

According to another feature of the present invention, the engagement structure may include a shallow strip embedded in a channel-shaped depression of the topside of the legs of the shoulder yoke and formed with a central longitude bead of omega-shaped configuration, and a triangular strip on the underside of the shoulder belts and formed with a central longitude groove having a configuration complementing a configuration of the longitude bead. The triangular strip has hereby a thickness which is at a maximum in the vertical longitudinal center axis of the shoulder belts and decreases toward the edges of the shoulder belts. When tightening the shoulder belt over the legs of the yoke, as the safety harness is fastened, the regions of the triangular strip adjacent the omega-shaped longitude bead wrap around the omega-shaped longitude bead in a form-fitting manner to realize an intimate interlock. This interlocked connection can be instantaneously reversed when releasing the shoulder belts so as to be able to separate the shoulder belts from the yoke.

According to another feature of the present invention, the engagement structure may include fibers produced through flocking on the topside of the shoulder yoke and on the underside of the legs of the shoulder belts, with the fibers of the legs extending at an inclination in the direction of the buckle of the safety harness and a vertical longitudinal center axis of the shoulder yoke, and the fibers of the shoulder belts extending at an inclination in opposite direction. The provision of such fibers results in a desired force-locking fit which can be varied within desired boundaries in dependence on the strength, length and density of the fibers. The engagement structure may also include a shallow strip embedded in a channel-shaped depression of the topside of the legs of the shoulder yoke, wherein the fibers of the legs are provided on the shallow strip. The fibers on the shoulder belts may be directly sprayed thereon.

According to another feature of the present invention, the engagement structure may include longitude beads and longitude grooves in longitudinal direction of the legs and the shoulder belts in partially offset relationship, with a first plurality of longitude beads and longitude grooves on a free end of the legs extending in substantial parallel relationship to a vertical longitudinal center axis of the shoulder yoke, and with a second plurality of longitude beads and longitude grooves on a junction from the legs to the collar extending in substantial parallel relationship to the legs, whereas a third plurality of longitude beads and longitude grooves of the shoulder belts adjacent to the collar extend in parallel relationship to the shoulder belts, and whereas a fourth plurality of longitude beads and longitude grooves of the shoulder belts adjacent to the free end of the legs extend at an angle to the longitudinal direction of the shoulder belts. This construction best suit reclined positions of drivers in cockpits of racecars, such a formula racecars. In these positions the bottom edge of the helmet is disposed at least partially in the central length portion of the legs on the shoulder belts so that no engagement structure is provided in these regions. Thus, there is no problem, if need be, to remove the shoulder belts from the legs.

According to another feature of the present invention, the engagement structure can be so configured that a length of an engagement structure component on the shoulder belts is shorter than a length of an engagement structure component on the legs.

According to another feature of the present invention, the engagement structure component on the shoulder belts may have sloped end portions, i.e. ramp-like end portions. In this way, a rail-like sliding of the structure of the shoulder belts upon the structure on the legs is ensured.

According to another feature of the present invention, the engagement structure component of the legs may include extruded sections which are made of rubber or plastic, and may then be secured, suitably glued, in channel-like depressions of the legs. The engagement structure component of the shoulder belts may be made of molded-on plastic. As an alternative, the engagement structure component of the shoulder belts may be made of profiled strands which are sewn to the shoulder belts. Conceivable is also an engagement structure made of profiled strands which are glued to the shoulder belts.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
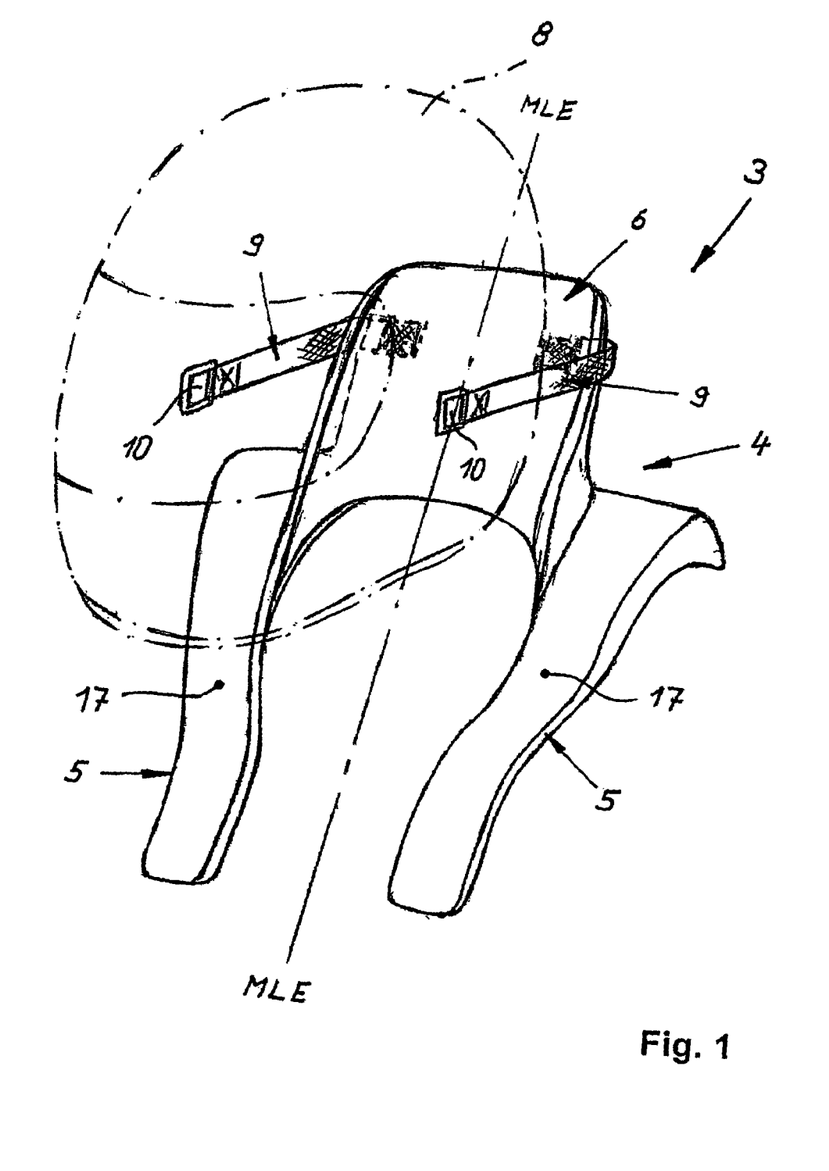
FIG. 1 is a perspective view of a head and neck support system having incorporated therein the subject matter according to the present invention.
Figure 2:
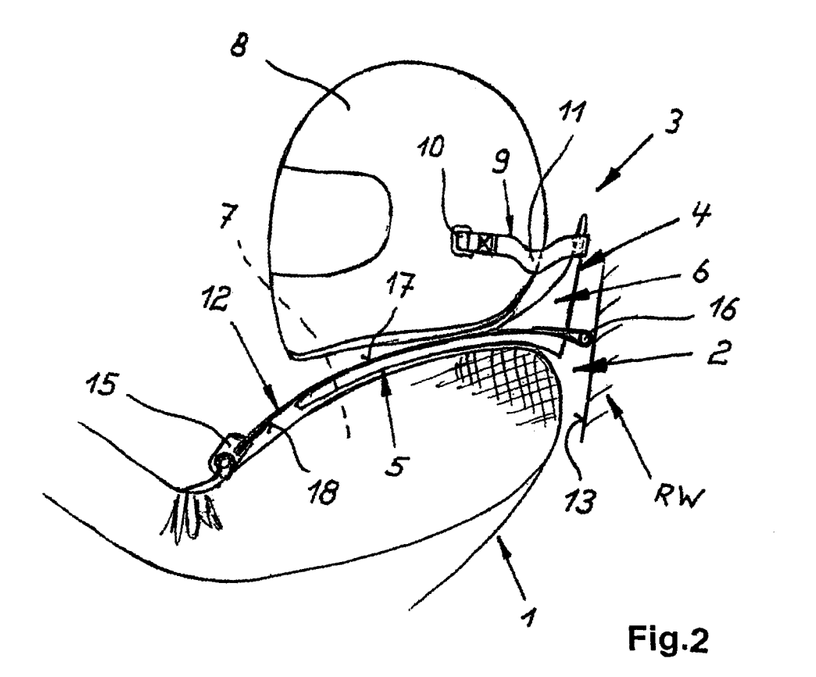
FIG. 2 is a schematic side view of a driver in a cockpit of a racecar with attached head and neck support in driving position.

Turning now to the drawing, and in particular to FIG. 1, there is shown a perspective view of a head and neck support system, generally designated by reference numeral 3 and having incorporated therein the subject matter according to the present invention. The head and neck support system 3, also called HANS system, is mounted on a driver 1 in a cockpit 2 of a racecar RW, as shown in FIG. 2, and includes a U-shaped restraining shoulder yoke 4 having a pair of legs 5, and a high collar 6 interconnecting the legs 5. The yoke 4 is made of plastic and contoured to conform to the torso or chest 7 of the driver 1. The driver 1 carries a helmet 8 which is connected to the collar 6 via tethers 9 of the head and neck support system 3. The tethers 9 are detachable secured to the helmet 8 by clips 10.

In driving position, as shown in FIG. 2, the tethers 9 are arranged between the collar 6 and the helmet 8 with slack 11 to allow limited mobility of the head of the driver 1 relative to the head and neck support system 3. The driver 1 is strapped in the cockpit 2 by a shoulder harness (not shown) having two textile shoulder belts 12 to extend over the legs 5 of the yoke 4 when the head and neck support system 3 is mounted on the driver 1. The shoulder belts 12 are secured behind the collar 6 to a back wall 13 of the cockpit 2 at an anchor point 16 and united on the chest side of the driver 1 in a central buckle 14 of the safety harness, as shown in FIG. 1. Integrated in the shoulder belts 12 are length adjustments 15 so as to be able to suit the length of the shoulder belts 12 to the driver's torso 7.

Figure 3:
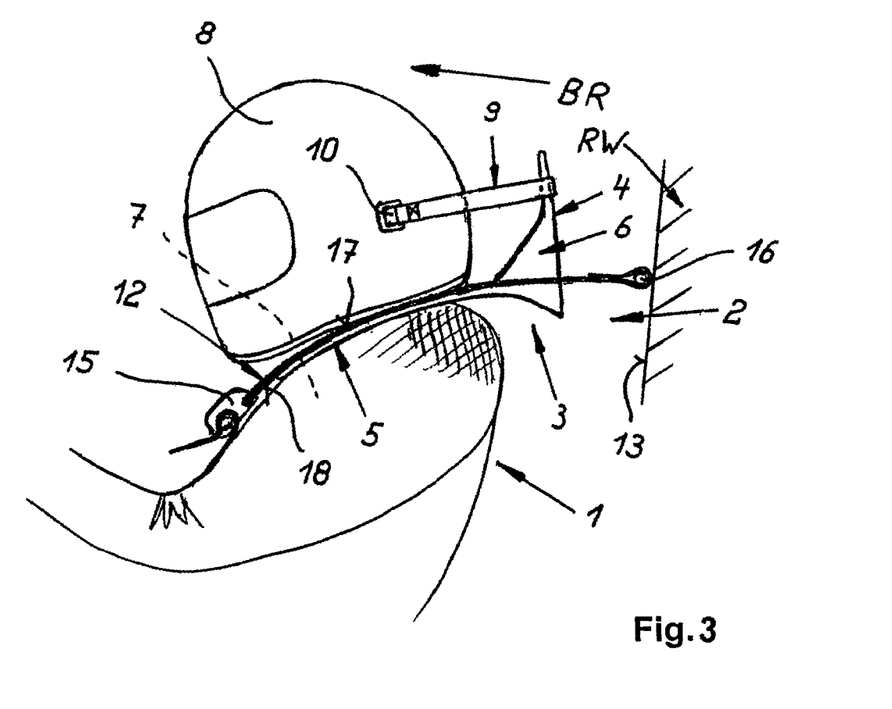
FIG. 3 is a schematic side view of the driver in the event of a frontal collision.

As shown in FIG. 2, the collar 6 of the head and neck support system 3 is spaced in driving position from the anchor point 16 of the shoulder belts 12 to the back wall 13 of the cockpit 2 by a relatively small distance. In the event of a crash, as shown in FIG. 3, the torso 7 as well as the head of the driver 1 shift in acceleration direction BR, thereby increasing the distance between the collar 6 and the back wall 13 and causing a relative shift between the yoke 4 and the torso 7. At the same time, the tethers 9 are tensed.

Figure 4:
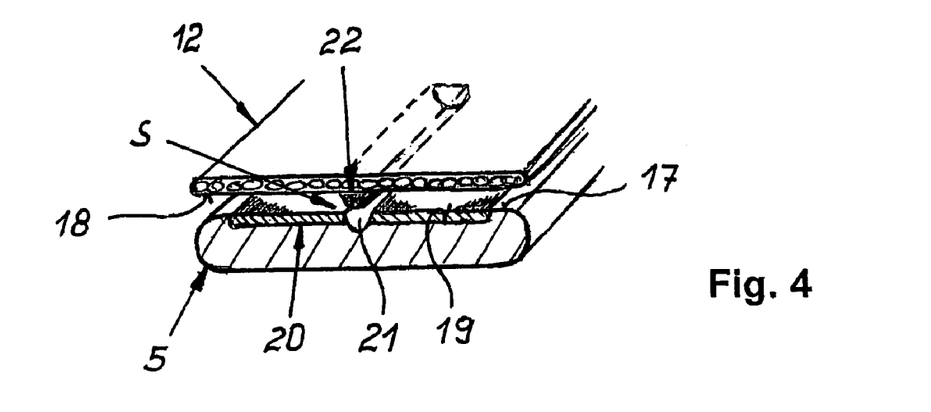
FIG. 4 is a cross sectional and perspective view of a shoulder belt and a leg of a shoulder yoke of a first embodiment of a head and neck support system according to the present invention.

Turning now to FIG. 4, there is shown a cross sectional and perspective view of one of the shoulder belts 12 and one of the legs 5 of the shoulder yoke 4 in accordance with a first embodiment of the novel and inventive head and neck support system 3. As both shoulder belts 12 and both legs 5 are of identical construction, it will be understood by persons skilled in the art that a description of one of the shoulder belts is equally applicable to the other shoulder belt, and a description of one of the legs is equally applicable to the other leg.

The leg 5 has a topside 17 which is formed with a channel-like depression 19. Cemented into the depression 19 is a shallow strip 20 which is made of rubber and formed with a central trough-shaped longitude groove 21. Molded onto a leg-confronting underside 18 of the shoulder belt 12 is a rounded longitude bead 22 which is made of plastic and has a cross section to conform to the cross section of the longitude groove 21. When the shoulder belt 12 is taut over the leg 5, the longitude bead 22 engages the longitude groove 21. This type of interacting engagement structure S allows a relative movement in longitudinal direction between the shoulder belt 12 and the leg 5 with increased friction, while at the same time inhibiting a transverse movement.

The interacting engagement structure S of the legs 5 and shoulder belts 12 is thus comprised of a longitude groove 21 in a shallow strip 20 and a complementary longitude bead 22 to realize a certain force-locking fit between the shoulder belts 12 and the shoulder yoke 4. This force-locking fit prevents in the event of a crash an inadmissible displacement of the yoke 4 and the torso 7 in acceleration direction BR. Rather, the yoke 4 remains relative to the torso 7 in proximity of the back wall 13 while the tethers 9 tighten.

Figure 5:
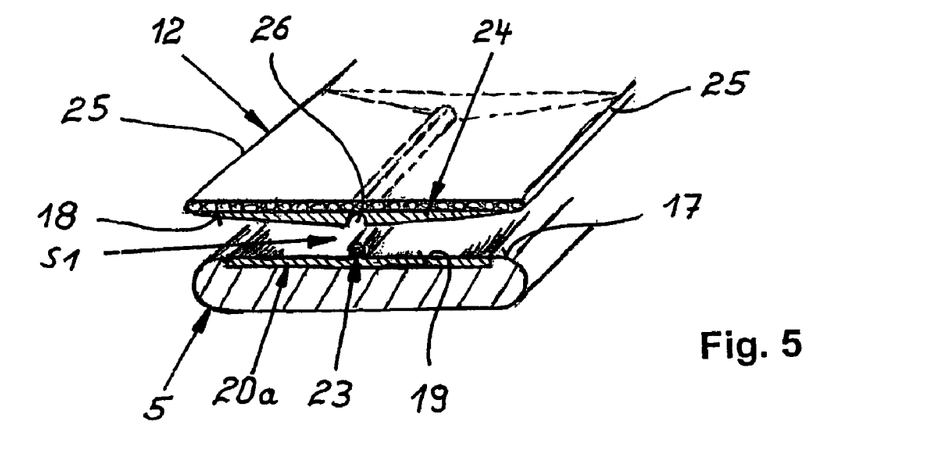
FIG. 5 is a cross sectional and perspective view of a shoulder belt and a leg of a shoulder yoke of a second embodiment of a head and neck support system according to the present invention.

FIG. 5 shows a cross sectional and perspective view of a second embodiment of a head and neck support system 3 according to the present invention. Parts corresponding with those in FIG. 4 are denoted by identical reference numerals and not explained again. The description below will center on the differences between the embodiments. In this embodiment, provision is made for a shallow strip 20a of rubber which is received in the depression 19 and provided with a central longitude bead 23 of omega-shaped cross section. Attached to the leg-confronting underside 18 of the shoulder belt 12 is a strip 24 made of plastic or rubber and having a triangular cross section which is at a greatest thickness in the vertical longitudinal center plane of the shoulder belt 12 and decreases in thickness in the direction of the marginal areas 25 of the shoulder belt 12. Formed in the strip 24 is a central through-shaped longitude groove 26 of U-shaped cross section.

Figure 6:
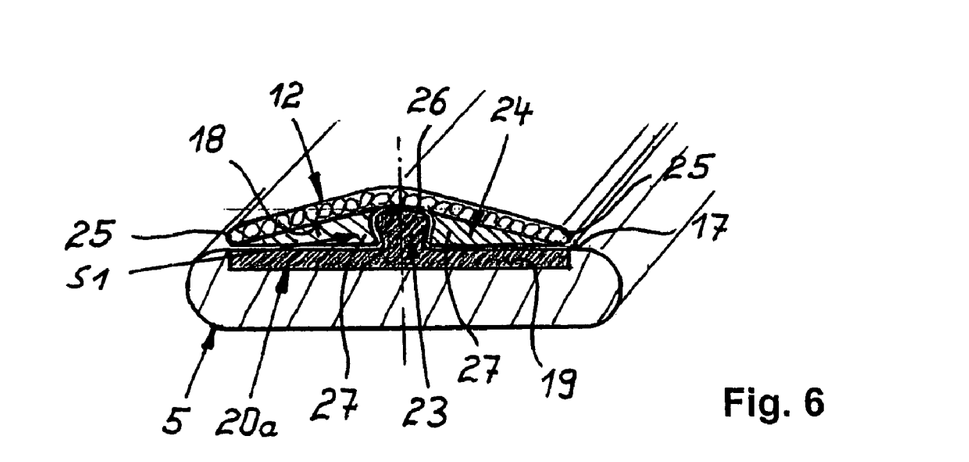
FIG. 6 is a cross sectional and perspective view of the head and neck support system of FIG. 5, when the shoulder belt is taut.

When the shoulder belt 12 is taut over the leg 5, as shown in FIG. 6, the marginal areas 25 of the shoulder belt 12 are pulled against the shallow strip 20a, resulting in regions 27 adjacent the longitude groove 26 to embrace form-fittingly the longitude bead 23 so that the longitude bead 23 becomes embedded in the longitude groove 26.

This type of interacting engagement structure S1, as shown in FIGS. 5 and 6, is thus formed by the shallow strip 20a with the longitude bead 23 on the legs 5 and by the triangular strip 24 with the longitude groove 26 on the shoulder belts 12 to realize the afore-described force-locking connection between the shoulder belts 12 and the shoulder yoke 4.

Figure 7:
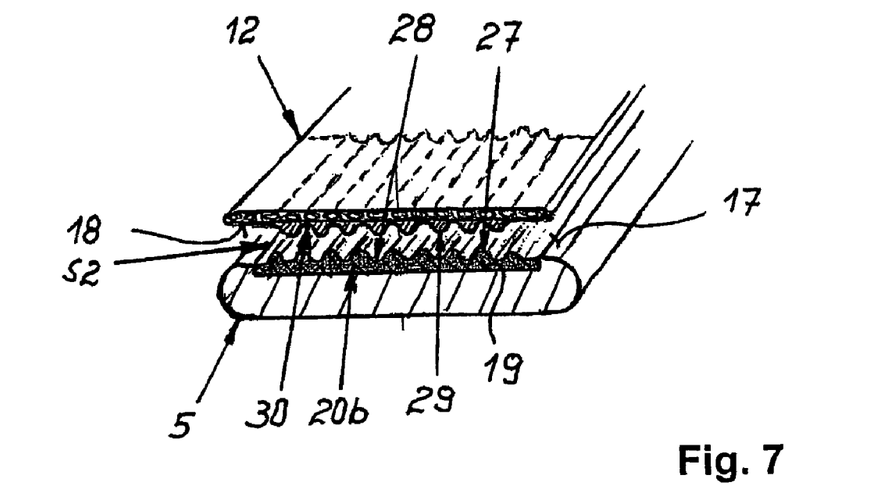
FIG. 7 is a cross sectional and perspective view of a shoulder belt and a leg of a shoulder yoke of a third embodiment of a head and neck support system according to the present invention.

Turning now to FIG. 7, there is shown a cross sectional and perspective view of a third embodiment of a head and neck support system 3 according to the present invention. Parts corresponding with those in FIG. 4 are denoted by identical reference numerals and not explained again. The description below will center on the differences between the embodiments. In this embodiment, provision is made for a shallow strip 20b of rubber which is received in the depression 19 and provided with several longitude beads 27 and longitude grooves 28 having a rounded or trough-shaped cross section and disposed in parallel side-by-side relationship. The leg-confronting underside 18 of the shoulder belt 12 is formed with longitude beads 29 and longitude grooves 30 with rounded or trough-shaped cross section to complement the cross section of the longitude beads 27 and longitude grooves 28 of the shallow strip 20b of the leg 5. The longitude beads 29 and longitude grooves 30 on the underside 18 of the shoulder belt 12 may hereby be made of plastic.

When the shoulder belt 12 is tightened over the leg 5 in longitudinal direction, the longitude beads 27 of the shallow strip 20b engage the longitude grooves 30 on the underside 18 of the shoulder belt 12, whereas the longitude beads 29 of the shoulder belt 12 engage the longitude grooves 28 of the shallow strip 20b. As a consequence, a transverse displacement of the shoulder belt 12 relative to the leg 5 is prevented, while the shoulder belt 12 is still able to move in longitudinal direction in relation to the leg 5, although at increased friction.

This type of interacting engagement structure S2, as shown in FIG. 7, is thus formed by the shallow strip 20b with the longitude beads 23 and longitudinal grooves 28 on the shallow strip 20b of the legs 5 of the yoke 4 and by the longitude beads 29 and longitude grooves 30 on the shoulder belts 12 to realize the afore-described force-locking connection between the shoulder belts 12 and the shoulder yoke 4.

Figure 8:
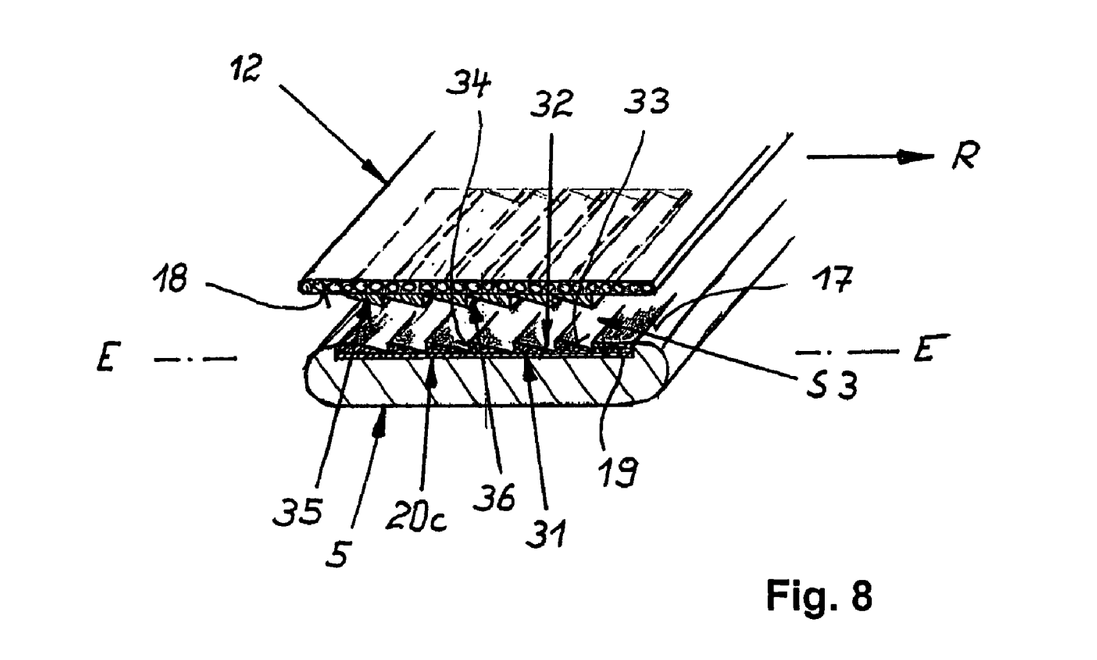
FIG. 8 is a cross sectional and perspective view of a shoulder belt and a leg of a shoulder yoke of a fourth embodiment of a head and neck support system according to the present invention.

FIG. 8 shows a cross sectional and perspective view of a fourth embodiment of a head and neck support system 3 according to the present invention. Parts corresponding with those in FIG. 4 are denoted by identical reference numerals and not explained again. The description below will center on the differences between the embodiments. In this embodiment, provision is made for a shallow strip 20c of rubber which is received in the depression 19 and has a saw-tooth like configuration of longitude beads 31 and longitude grooves 32 of triangular cross section. As a consequence, surfaces 33 are provided which extend at an inclination to a plane E—E of the shallow strip 20c, and surfaces 34 which extend at a right angle to the plane E—E. The surfaces 34 of the longitude beads 31 are directed frontally to the vertical longitudinal center plane MLE (FIG. 1) between the legs 5 of the yoke 4.

The leg-confronting underside 18 of the shoulder belt 12 is formed in opposition to the saw-tooth configuration of the leg 5 with a complementary saw-tooth like configuration of longitude beads 35 and longitude grooves 36 of triangular cross section, which may also be made of plastic and molded onto the underside 18.

When the shoulder belt 12 is tightened over the leg 5 in longitudinal direction, the longitude beads 31 of the shallow strip 20c engage the longitude grooves 36 on the underside 18 of the shoulder belt 12, whereas the longitude beads 35 of the shoulder belt 12 engage the longitude grooves 32 of the shallow strip 20b. As a consequence, a transverse displacement of the shoulder belt 12 relative to the leg 5 is prevented, while the shoulder belt 12 is still able to move in longitudinal direction in relation to the leg 5, although at increased friction.

This type of interacting engagement structure S3, as shown in FIG. 8, is thus formed by the shallow strip 20c with the longitude beads 31 and longitudinal grooves 32 on the shallow strip 20c of the legs 5 of the yoke 4 and by the longitude beads 35 and longitude grooves 36 on the shoulder belts 12 to realize the afore-described force-locking connection between the shoulder belts 12 and the shoulder yoke 4.

Figure 9:
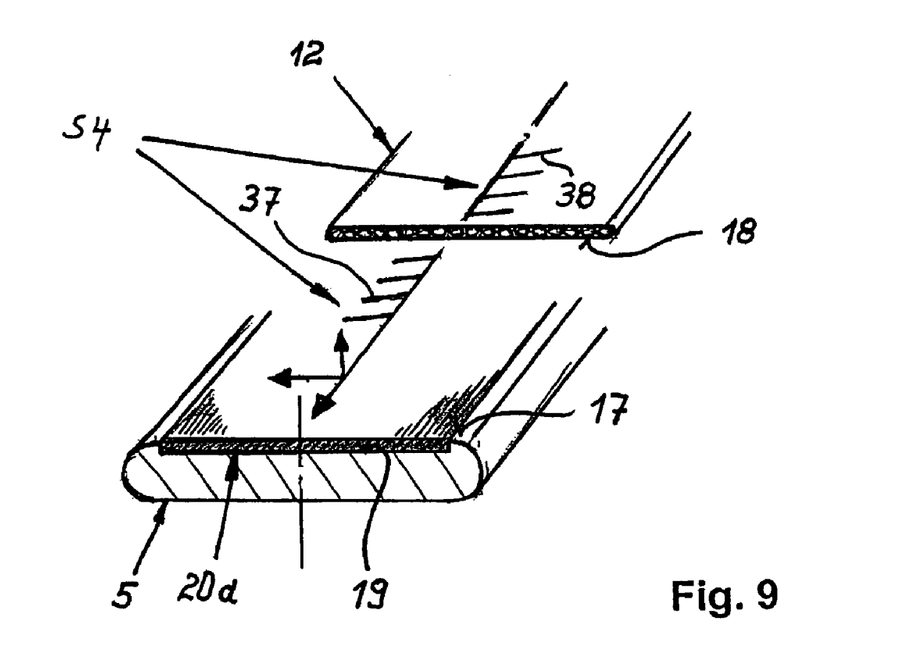
FIG. 9 is a cross sectional and perspective view of a shoulder belt and a leg of a shoulder yoke of a fifth embodiment of a head and neck support system according to the present invention.

Turning now to FIG. 9, there is shown an engagement structure S4 between the leg 5 of the yoke 4 and the shoulder belt 12, which engagement structure S4 is formed by flocking to produce an electrostatic adhesion of fibers 37, 38 on the leg 5 and the underside 18 of the shoulder belt 12. During flocking, the fibers 37, 38 are aligned by an electrostatic field in such a manner that the fibers 37, which adhere to a shallow strip 20d made of plastic and received in the depression 19 on the topside of the leg 5, are directed toward the buckle 14 of the safety harness as well as to the vertical longitudinal center axis MLE of the yoke 4, whereas the fibers 38, which adhere to the leg-confronting underside 18 of the shoulder belt 12, extend slantingly in opposition to the fibers 37.

Figure 10:
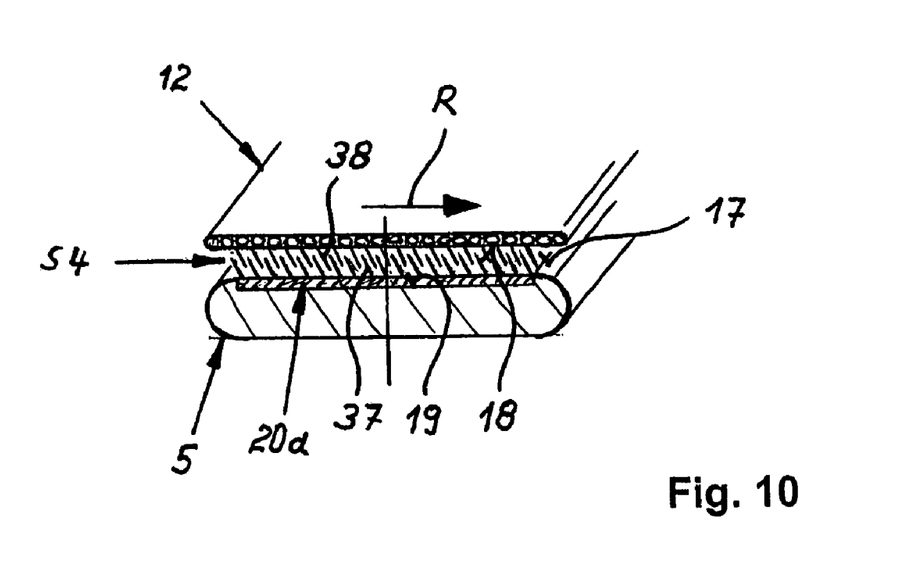
FIG. 10 is a cross sectional and perspective view of the head and neck support system of FIG. 9, when the shoulder belt is taut.

This type of engagement structure S4 also realizes a sufficient friction as the shoulder belts 12 move in relation to the legs 5 in longitudinal direction, while inhibiting a transverse movement in a direction indicated by arrow R, shown in FIG. 10) and facing away from the longitudinal center axis MLE.

When reversing the taut state of the shoulder belt 12, it is easily possible to separate the shoulder belt 12 from the leg 5.

Figure 11:
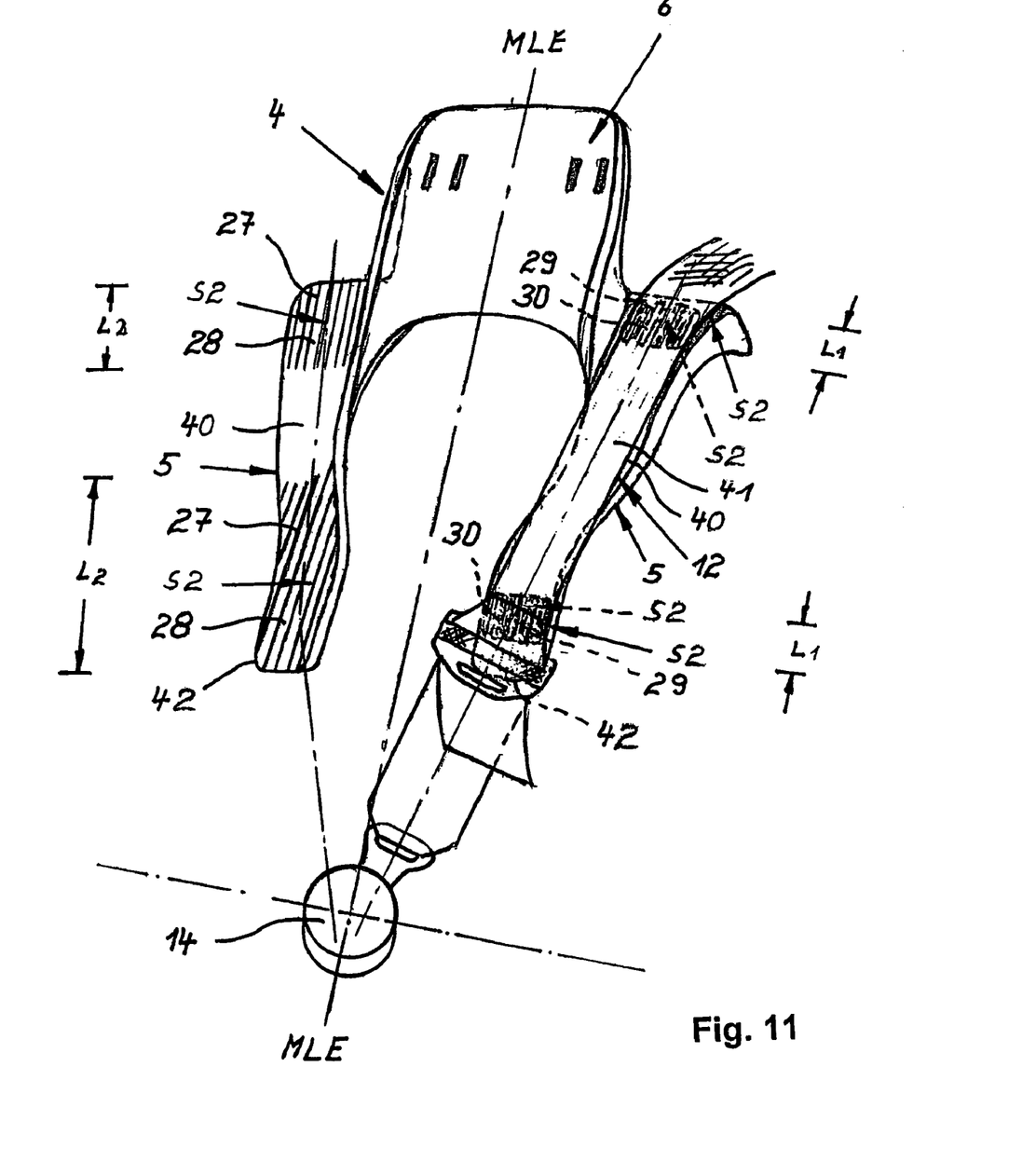
FIG. 11 is a cross sectional and perspective view of a shoulder belt and a leg of a shoulder yoke of a sixth embodiment of a head and neck support system according to the present invention.
Figure 15:
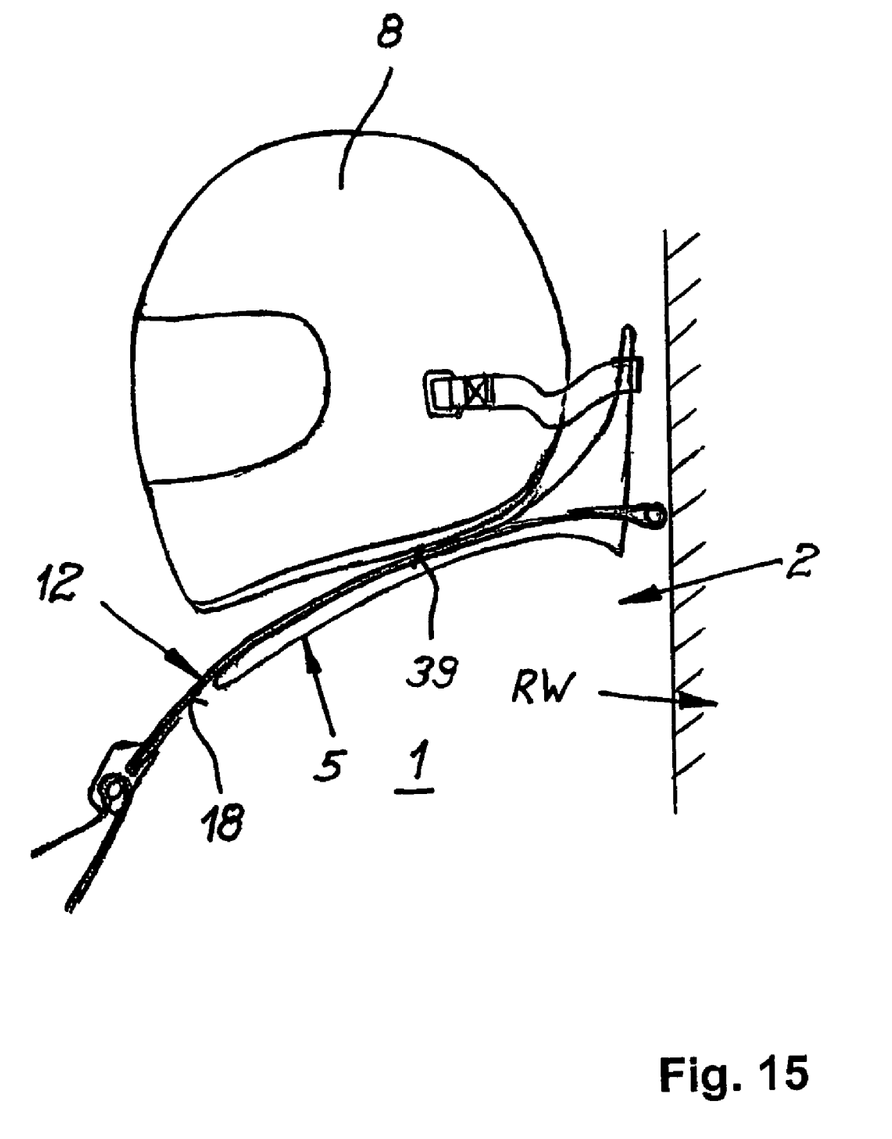
FIG. 15 is a schematic side view of a driver in a cockpit of a racecar with attached head and neck support of FIG. 11 in driving position.

Turning now to FIG. 11, there is shown a cross sectional and perspective view of a sixth embodiment of a head and neck support system 3 according to the present invention. This embodiment is especially suitable for a situation in which the driver 1 assumes a substantially reclined position in the cockpit 2. The helmet 8 has a bottom edge 39 (FIG. 15) which extends in central length portions 40, 41 of the legs 5 upon the shoulder belts 12. Thus, no friction should take place in these length portions 40, 41 of the legs 5 and the shoulder belts 12. Rather engagement structures S, S1, S2, S3, S4 are provided between the topsides 17 of the free ends 42 of the legs 5 as well as on the transition zone between the legs 5 and the collar 6 of the yoke 4, on the one hand, and the leg-confronting undersides 18 of the shoulder belts 12.

Figure 14:
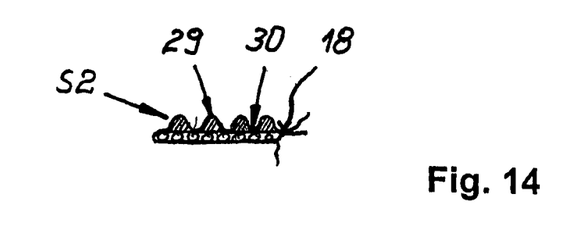
FIG. 14 is a cross sectional view of the shoulder belt of FIG. 12, taken along the line XIV—XIV.

Currently preferred is the use of the engagement structure S2, as shown in FIGS. 7 and 14 in the form of longitude beads 27, 29 and longitude grooves 28, 30 of rounded cross section. Hereby, the engagement structure S2 between the legs 5 and the shoulder belts 12 are so constructed that the longitude beads 27 and the longitude grooves 28 at the free ends 42 of the legs 5 extend in substantial parallel relationship to the vertical longitudinal center plane MLE of the yoke 4, and the longitude beads 27 and the longitude grooves 29 at the transition zone between the legs 5 ad the collar 6 extend in substantial parallel relationship to the legs 5. The longitude beads 29 and the longitude grooves 30 on the shoulder belts 12 in neighboring disposition to the collar 6 extend in substantial parallel relationship to the longitudinal direction of the shoulder belts 12, whereas the longitude beads 29 and the longitude grooves 30 on the shoulder belts 12 extend next to the free end 42 of the legs 5 at an angle to the longitudinal direction of the shoulder belts 12.

Figure 12:
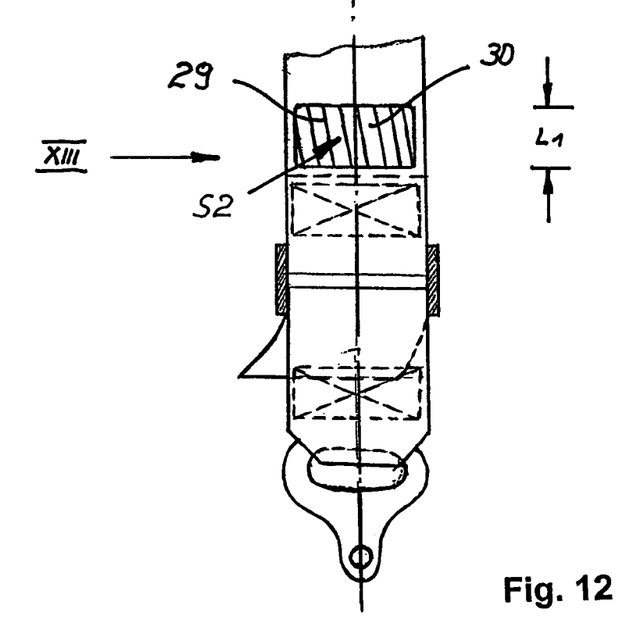
FIG. 12 is a bottom view of the shoulder belt of FIG. 11.
Figure 13:
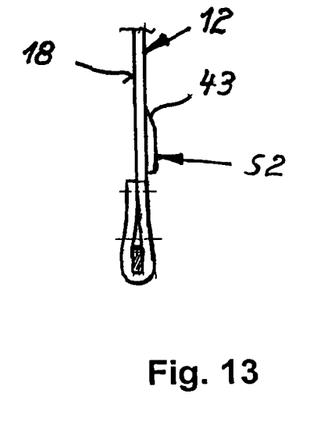
FIG. 13 is a partial side view of the shoulder belt of FIG. 12, as viewed in a direction of arrow XIII in FIG. 12.

As further shown in FIGS. 11 and 12, the component of the engagement structure S2 on the shoulder belts 12 has hereby a length L1 which is shorter than the length L2 of the component of the engagement structure S2 on the legs 5. In order to improve the rail-like gliding of the engagement structure S2, the end regions 43 of the component of engagement structure S2 on the shoulder belts 12 is sloped, i.e. ramp-like.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A restraint system for restraining a person in a vehicle of transportation, comprising:
   a safety harness having length adjustable shoulder belts and a buckle for connecting the shoulder belt on a chest-side of a person;
   a stiff U-shaped shoulder yoke having legs, which are contoured to a torso of the person, and a high collar interconnecting the legs; and
   fastening means for securing the shoulder belts behind the collar,
   wherein the legs of the shoulder yoke have a side in confronting relationship to a side of the shoulder belts, with the confronting sides formed, at least partially, with an interacting engagement structure which is configured to increase friction as the shoulder belts move in relation to the legs in longitudinal direction, while inhibiting a displacement of the shoulder belts in relation to the legs in transverse direction.

2. The restraint system of claim 1, wherein one of the sides is a topside of the legs of the shoulder yoke, and the other one of the sides is an underside of the shoulder belts.

3. The restraint system of claim 1, wherein the engagement structure includes a longitude bead formed on one of the sides, and a longitude groove formed on the other one of the sides and having a configuration suited to a cross section of the longitude bead.

4. The restraint system of claim 2, wherein the engagement structure includes a shallow strip embedded in a channel-shaped depression of the topside of the legs of the shoulder yoke and formed with longitude beads in parallel relationship and longitude grooves in neighboring relationship for interaction with complementary opposite longitude grooves and longitude beads in neighboring relationship formed on the underside of the shoulder belts.

5. The restraint system of claim 4, wherein the longitude beads of the shallow strip and the underside of the shoulder belts have an arched cross section, and the longitude grooves of the shallow strip and the underside of the shoulder belts have a trough-shaped cross section.

6. The restraint system of claim 4, wherein the shallow strip defines a plane, said longitude beads and said longitude grooves of the shallow strip and the underside of the shoulder belts having a triangular cross section defined by a first surface extending at an inclination to the plane and a second surface extending at a right angle to the plane, with the second surface of the longitude beads of the legs of the shoulder yoke directed frontally to a vertical longitudinal center axis defined between the legs of the shoulder yoke.

7. The restraint system of claim 2, wherein the engagement structure includes a shallow strip embedded in a channel-shaped depression of the topside of the legs of the shoulder yoke and formed with a central longitude groove, and a longitude bead formed on the underside of the shoulder belt and having a configuration complementing a configuration of the longitude groove.

8. The restraint system of claim 2, wherein the engagement structure includes a shallow strip embedded in a channel-shaped depression of the topside of the legs of the shoulder yoke and formed with a central longitude bead of omega-shaped configuration, and a triangular strip on the underside of the shoulder belts and formed with a central longitude groove having a configuration complementing a configuration of the longitude bead.

9. The restraint system of claim 2, wherein the engagement structure includes fibers adhering through flocking on the topside of the shoulder yoke and on the underside of the legs of the shoulder belts, said fibers of the legs extending at an inclination in the direction of the buckle of the safety harness and a vertical longitudinal center axis of the shoulder yoke, and said fibers of the shoulder belts extending at an inclination in opposite direction.

10. The restraint system of claim 9, wherein the engagement structure includes a shallow strip embedded in a channel-shaped depression of the topside of the legs of the shoulder yoke, said fibers of the legs being provided on the shallow strip.

11. The restraint system of claim 1, wherein the engagement structure includes plural of said longitude bead and plural of said longitude groove in longitudinal direction of the legs and the shoulder belts in partially offset relationship, with a first plurality of longitude beads and longitude grooves on a free end of the legs extending in substantial parallel relationship to a vertical longitudinal center axis of the shoulder yoke, and with a second plurality of longitude beads and longitude grooves on a junction from the legs to the collar extending in substantial parallel relationship to the legs, whereas a third plurality of longitude beads and longitude grooves of the shoulder belts adjacent to the collar extends in parallel relationship to the shoulder belts, and whereas a fourth plurality of longitude beads and longitude grooves of the shoulder belts adjacent to the free end of the legs extends at an angle to the longitudinal direction of the shoulder belts.

12. The restraint system of claim 11, wherein the engagement structure are so constructed that a length of an engagement structure component on the shoulder belts is shorter than a length of an engagement structure component on the legs.

13. The restraint system of claim 11, wherein the engagement structure component on the shoulder belts has a sloped end portion.

14. The restraint system of claim 1, wherein the engagement structure includes extruded sections formed on the legs and made of rubber or plastic.

15. The restraint system of claim 1, wherein the engagement structure includes molded-on plastic on the shoulder belts.

16. The restraint system of claim 1, wherein the engagement structure includes profiled strands sewn to the shoulder belts.

17. The restraint system of claim 1, wherein the engagement structure includes profiled strands glued to the shoulder belts.

* * * * *